US011392698B2

(12) United States Patent
Shen-Orr et al.

(10) Patent No.: US 11,392,698 B2
(45) Date of Patent: Jul. 19, 2022

(54) ACTIVE SIDE-CHANNEL ATTACK PREVENTION

(71) Applicant: Intel Corporation, Santa Clara, CA (US)

(72) Inventors: Chaim Shen-Orr, Haifa (IL); Baruch Chaikin, D. N. Misagv (IL); Ahmad Yasin, Haifa (IL); Reuven Elbaum, Haifa (IL)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 16/354,258

(22) Filed: Mar. 15, 2019

(65) Prior Publication Data

US 2019/0213330 A1 Jul. 11, 2019

(51) Int. Cl.
*H04N 7/16* (2011.01)
*G06F 7/04* (2006.01)
*G06F 21/56* (2013.01)
*G06F 12/1027* (2016.01)
*G06F 21/55* (2013.01)

(52) U.S. Cl.
CPC ........ *G06F 21/566* (2013.01); *G06F 12/1027* (2013.01); *G06F 21/556* (2013.01); *G06F 2212/684* (2013.01); *G06F 2221/034* (2013.01)

(58) Field of Classification Search
CPC .. G06F 21/566; G06F 12/1027; G06F 21/556; G06F 2212/684; G06F 2221/034
USPC .......................................................... 726/23
See application file for complete search history.

(56) References Cited

U.S. PATENT DOCUMENTS

| 2004/0158736 | A1* | 8/2004 | Watt | G06F 21/74 |
| | | | | 713/166 |
| 2004/0177269 | A1* | 9/2004 | Belnet | G06F 12/1491 |
| | | | | 726/27 |
| 2014/0181976 | A1* | 6/2014 | Snow | G06F 21/566 |
| | | | | 726/23 |
| 2015/0089146 | A1* | 3/2015 | Gotwalt | G06T 1/60 |
| | | | | 711/133 |
| 2015/0370728 | A1* | 12/2015 | Yamada | G06F 12/1416 |
| | | | | 711/163 |
| 2017/0097896 | A1* | 4/2017 | Molnar | G06F 12/145 |

(Continued)

OTHER PUBLICATIONS

Wenhao Wang; Leaky Cauldron on the Dark Land: Understanding Memory Side-Channel Hazards in SGX; ACM:2017; pp. 2421-2433.*

*Primary Examiner* — Monjur Rahim
(74) *Attorney, Agent, or Firm* — Alliance IP, LLC

(57) ABSTRACT

The present disclosure is directed to systems and methods of detecting a side-channel attack detecting a translation lookaside buffer (TLB) miss on a virtual address lookup caused by the speculative execution of an instruction and determining that the physical memory address associated with the virtual address lookup contains a privileged object or a secret object. Range register circuitry determines whether the physical memory address is located in an address range containing privileged objects or secret objects. Performance monitoring counter (PMC) circuitry generates an interrupt in response to receipt of information indicative of the TLB miss and information indicative that the physical memory address contains a privileged object or a secret object. The PMC circuitry causes the storage of information associated with the speculatively executed instruction causing the virtual address lookup.

18 Claims, 4 Drawing Sheets

(56) References Cited

U.S. PATENT DOCUMENTS

| | | | |
|---|---|---|---|
| 2017/0249260 A1* | 8/2017 | Sahita | G06F 12/1009 |
| 2019/0004972 A1 | 1/2019 | Bear et al. | |
| 2019/0130104 A1* | 5/2019 | Carlson | G06F 21/6218 |
| 2019/0163902 A1* | 5/2019 | Reid | G06F 9/3851 |
| 2020/0372129 A1* | 11/2020 | Gupta | G06F 21/577 |
| 2020/0410088 A1* | 12/2020 | Greenhalgh | G06F 21/556 |

* cited by examiner

ACTIVE SIDE-CHANNEL ATTACK PREVENTION

TECHNICAL FIELD

The present disclosure relates to computer security, specifically the detection and mitigation of side-channel attacks.

BACKGROUND

Side-channel attacks gained widespread notoriety in early 2018. A side-channel attack includes any attack based on information gained from the implementation of a computer system, rather than weaknesses in the implemented algorithm itself. Such side-channel attacks may use timing information, power consumption, electromagnetic leaks or even sound as an extra source of information, that is exploited to obtain information and/or data from the system. Side-channel attacks include Spectre and Meltdown, both of which rely on deducing whether data originates in a cached or un-cached location. To a significant degree, the determination of where data originates relies upon the precise timing of events such as loads from memory space.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
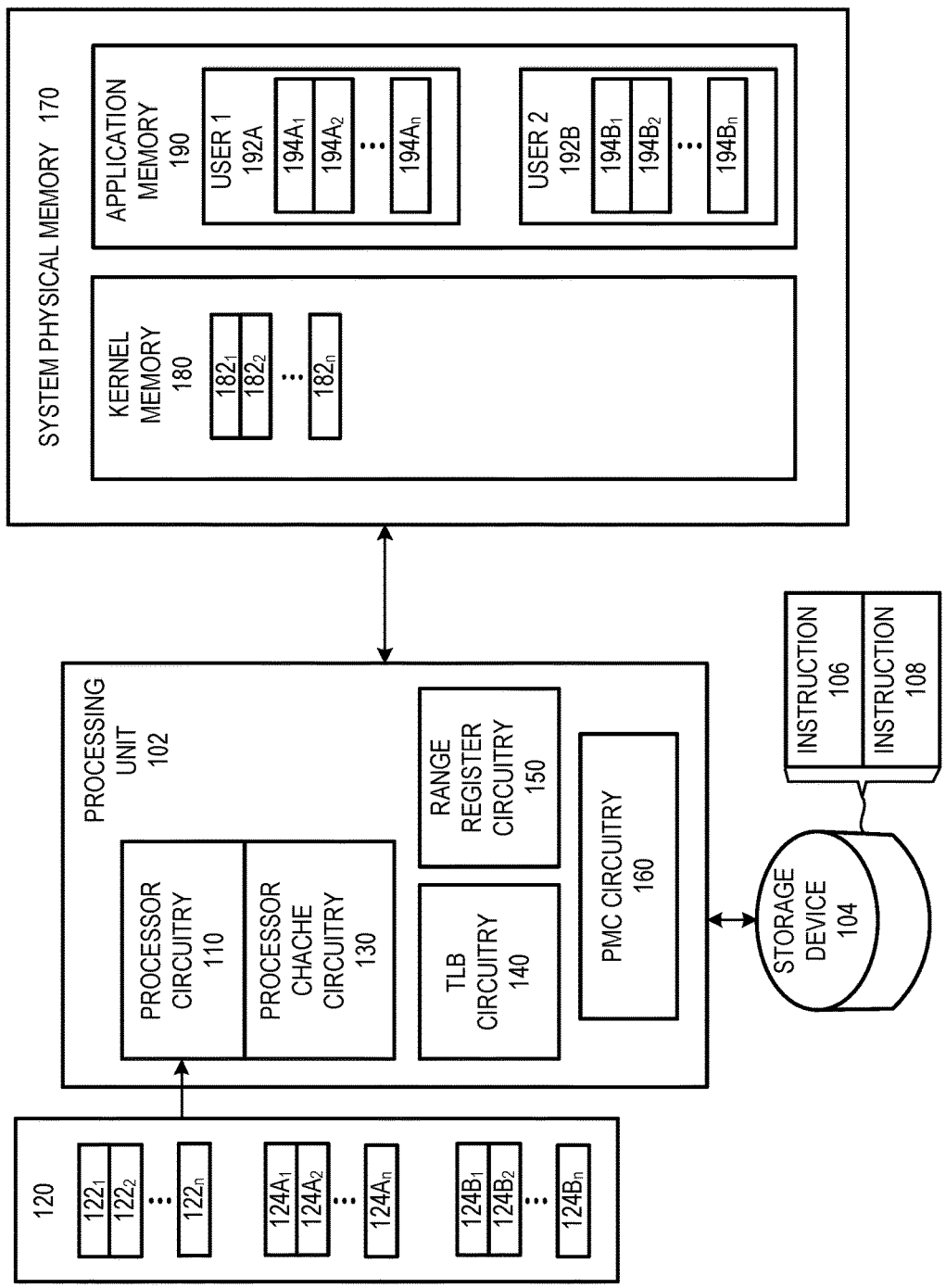
FIG. 1 is a schematic diagram of an illustrative system in which processor circuitry executes instructions that include: kernel address space layout (KASLR) randomization instructions and side-channel attack detection instructions that cause range register circuitry to identify virtual addresses corresponding to physical addresses containing a privileged object or a secret object and that cause performance monitoring counter (PMC) circuitry to generate a performance monitoring interrupt responsive to detecting one or more translation lookaside buffer (TLB) misses and one or more attempted accesses of a privileged object or a secret object in physical memory, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Kernel address space layout randomization (KASLR) increases the difficulty of code injection exploits by placing kernel objects at random, rather than fixed, addresses within a physical memory space accessible only to processes having kernel level (i.e., RING 0) privileges. During the boot process, the system reserves a relatively large number pages within virtual memory (e.g., $2^{22}$ virtual memory pages) for use by the RING 0 kernel. However, only a very small number of these virtual memory pages point to physical memory addresses containing kernel code and/or data (hereinafter referred to collectively as "kernel objects").

Translation lookaside buffers (TLBs) map virtual memory addresses to physical memory addresses in system memory. A range register is a programmable model-specific register (MSR) used to store, retain, or otherwise contain information indicative of how information and/or data accessed at a physical memory address included within the range register is cached by the processor cache memory. Example access modes to memory ranges include uncached, write-through, write-combining, write-protect, and write-back. In operation, the system processor may generate range registers that include physical memory addresses that contain: privileged information and/or data (e.g., kernel or RING0 accessible data) and/or secret information and/or data (e.g., RING3 accessible data of each system user on a multi-user system).

A class of side channel attacks (SCAs) relies upon "training" the TLB to map to a physical memory address that contains privileged or secret information and/or data. Such training, by necessity, involves causing one or more speculative TLB misses using the desired physical memory address until the TLB successfully maps to the desired physical memory address containing the privileged or secret information and/or data. The systems and methods disclosed herein beneficially detect and count, using one or more performance monitoring counter (PMC) circuits, instances where a speculative TLB miss is directed to a physical memory address containing secret or privileged information as determined using a range register containing the physical memory address and associated with the kernel or one or more applications executed by the processor.

Upon detecting the TLB miss indicative of an attempted access to a physical memory address containing privileged and/or secret information and/or data, the PMC circuit may invoke a performance monitoring interrupt (PMI). In response, the PMI handler circuit causes a storage of information associated with the attempted access. Such information may include but is not limited to: instruction pointer (IP or program counter) and other contextual information such as the control register (e.g., CR3) data associated with the offending application/attacker. Additionally, or alternatively, event-based sampling (e.g., precise event-based sampling, "PEBS") circuitry may cause the storage of IP/program counter and/or control register data in memory-resident buffer circuitry thereby enabling the operating system to serve a batch of access attempts with a single interrupt. The SCA systems and methods disclosed herein beneficially and advantageously impose a negligible overhead burden on the host system such that, in the absence of a SCA, system performance remains unaffected. The SCA systems and methods disclosed herein beneficially and advantageously provide a platform independent solution that is based on a hardware device (performance monitoring counter circuitry) rather than a software module executed by the operating system. Thus, the SCA solution disclosed herein may easily be ported to other platforms, operating systems, and/or hypervisors.

A side-channel attack detection system is provided. The system may include: processor circuitry to speculatively execute an instruction; physical memory circuitry coupled to the processor circuitry; translation lookaside buffer (TLB) circuitry to determine a physical memory address corresponding to a virtual memory address responsive to the speculative execution of the instruction by the processor circuitry; range register circuitry to determine whether the physical memory address falls within a defined range of physical memory addresses; and performance monitoring counter (PMC) circuitry to generate a performance monitoring interrupt responsive to receipt of information indicative of: a miss in the TLB circuitry of the virtual memory address; and the physical memory address falling within the defined range of physical memory addresses.

A non-transitory storage device is provided. The non-transitory storage device may include instructions that, when executed, cause processor circuitry to: speculatively execute an instruction that causes a memory access at a virtual memory address; cause translation lookaside buffer (TLB) circuitry to determine a physical memory address corresponding to the virtual memory address; cause range register circuitry to determine whether the physical memory address falls within a defined range of physical memory addresses; and cause performance monitoring counter (PMC) circuitry to generate a performance monitoring interrupt responsive to: a miss in the TLB circuitry of the virtual memory address; and the physical memory address falling within the defined range of physical memory addresses.

A side-channel attack detection system is provided. The system may include: means for speculatively executing an instruction that causes a memory access at a virtual memory address; means for determining a physical memory address corresponding to the virtual memory address; means for determining whether the physical memory address falls within a defined range of physical memory addresses; and means for generating a performance monitoring interrupt responsive to: a miss in the TLB circuitry of the virtual memory address; and the physical memory address falling within the defined range of physical memory addresses.

A side-channel attack detection method is provided. The method may include: speculatively executing, by processor circuitry, an instruction that causes a memory access at a virtual memory address; determining, by translation lookaside buffer (TLB) circuitry, a physical memory address corresponding to the virtual memory address; determining, by range register circuitry, whether the physical memory address falls within a defined range of physical memory addresses; and generating, by performance monitoring counter (PMC) circuitry, a performance monitoring interrupt responsive to: a miss in the TLB circuitry of the virtual memory address; and the physical memory address falling within the defined range of physical memory addresses.

An electronic device is provided. The electronic device may include: a printed circuit board; network interface circuitry; and a side-channel attack detection system comprising: processor circuitry coupled to the printed circuit board, the processor circuitry to: execute an operating system; speculatively execute an instruction; physical memory circuitry coupled to the processor circuitry; translation lookaside buffer (TLB) circuitry to determine a physical memory address corresponding to a virtual memory address responsive to the execution and/or speculative execution of the instruction by the processor circuitry; range register circuitry to determine whether the physical memory address falls within a defined range of physical memory addresses; performance monitoring counter (PMC) circuitry to generate a performance monitoring interrupt responsive to receipt of information indicative of: a miss in the TLB circuitry of the virtual memory address; and the physical memory address falling within the defined range of physical memory addresses.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

FIG. 1 is a schematic diagram of an illustrative system 100 in which processor circuitry 110 executes instructions that include: kernel address space layout (KASLR) randomization instructions 106 and side-channel attack detection instructions 108 that cause range register circuitry 150 to identify whether a speculatively executed instruction causing a memory access at a virtual address is mapped to a physical address containing a privileged object or a secret object, in accordance with at least one embodiment described herein. Where a speculatively executed instruction performs a memory access at a virtual address causing a TLB miss and where range register circuitry 150 determines the physical address mapped to virtual address contains a privileged object or a secret object, the performance monitoring counter (PMC) circuitry 160 to generate a performance monitoring interrupt. As depicted in FIG. 1, the processor circuitry 110, cache circuitry 130, translation lookaside buffer (TLB) circuitry 140, range register circuitry 150, and PMC circuitry 160 may be disposed in one or more processing units 102, such as a central processing unit (CPU), system on chip (SoC), or multi-chip module (MCM). A storage device 104 coupled to the one or more processing units 102, such as a solid-state drive (SSD), flash drive, or rotating magnetic drive, stores at least some of the instructions, for example all or a portion of the kernel address space layout (KASLR) randomization instructions 106 and side channel attack detection instructions 108.

The system 100 allocates, determines, or otherwise generates a plurality of kernel virtual addresses $122_1$-$122_n$ for use by the operating system. Each of the kernel virtual addresses $122_1$-$122_n$ (collectively, "kernel virtual addresses 122") may be associated with or mapped to a respective range of physical memory addresses $182_1$-$182_n$ (collectively, "kernel physical addresses 182"), each containing a privileged kernel object. Similarly, each application executed by the processor circuitry 110 may be allocated a respective range of virtual memory addresses. For example, a first application executed by a first user may be allocated a first virtual address range $124A_1$-$124A_n$ (collectively, "first app virtual addresses 124A") mapped to respective range of physical memory addresses $194A_1$-$194A_n$ (collectively, "first app physical addresses 194A), each containing a secret object associated with the first application. Similarly, a second application executed by a second user may be allocated a second virtual address range $124B_1$-$124B_n$ (collectively, "second app virtual addresses 124B") mapped to respective range of physical memory addresses 194B$_1$-194B$_n$ (collectively, "second app physical addresses 194B), each containing a secret object associated with the second application.

In operation, as memory access operations are performed, the processor circuitry 110, using the virtual address originated by the kernel or a user application causes a lookup operation in the translation lookaside buffer circuitry 140 to determine the physical memory address corresponding to the requested virtual memory address. The range register circuitry determines whether the requested virtual address corresponds to a kernel physical address 182 in a physical address range 180 containing a privileged object associated with the kernel or a physical address range 192A, 192B containing a secret object associated with a user application. In response to a detecting a TLB miss involving a physical memory address containing either a privileged object associated with the kernel or a secret object associated with a system user, the PMC circuitry 160 causes a performance monitoring interrupt (PMI) notifying the operating system of an occurrence of a potential side channel attack.

The processor circuitry 110 may include any number and/or combination of currently available and/or future developed electronic components, semiconductor devices, and/or logic elements capable of executing instructions that include but are not limited to: the operating system instructions, the KASLR instructions 106, and the side-channel attack detection instructions 108. The processor circuitry 110 may include any of a wide variety of commercially available processors, including without limitation, an AMD® Athlon®, Duron® or Opteron® processor; an ARM® application, embedded and secure processors; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of the processor circuits may comprise a multi-core processor (whether the multiple cores coexist on the same or separate dies), and/or a multi-processor architecture of some other variety by which multiple physically separate processors are in some way linked.

The processor circuitry 110 may execute one or more instructions during a bootstrap or "boot" routine when the system 100 is initially powered or started. During system boot, start-up, or restart the processor circuitry 110 may execute one or more instructions 106 that randomize the layout of the kernel address space (e.g., KASLR). Using KASLR, the location of kernel objects is randomized within the kernel memory 180 and the kernel virtual memory addresses may also be randomized. The processor circuitry 110 also allocates a range of virtual memory addresses for each application executed by each user in a multi-user system. For example, as depicted in FIG. 1, the processor circuitry may allocate a first app virtual address range 124A$_1$-124A$_n$ to a first application executed by a first system user and a second virtual address range 124B$_1$-124B$_n$ to a second application executed by a second system user. The processor circuitry 110 may generate page tables that map each of the kernel virtual addresses 122$_1$-122$_n$ to a respective physical memory address 182$_1$-182$_n$. Similarly, the processor circuitry 110 may generate page tables that map each of the first virtual addresses 124A$_1$-124A$_n$ to respective physical memory address 194A$_1$-194A$_n$ and each of the second virtual addresses 124B$_1$-124B$_n$ to a respective physical memory address 194B$_1$-194B$_n$.

The processor cache circuitry 130 includes any number and/or combination of electrical components, semiconductor devices, and/or logic elements capable of non-persistently storing digital information and/or data. In embodiments, all or a portion of the processor cache circuitry 130 may be communicably coupled to the processor circuitry 110. In other embodiments, all or a portion of the processor cache circuitry 130 may be shared between multiple processor circuits 110$_1$-110$_n$. In embodiments, the processor cache circuitry 130 may store information and/or data as a cache line, for example, as a 64-byte cache line. The cache circuitry 130 may bidirectionally communicate information and/or data to the processor circuitry 110. The processor cache circuitry 130 may include any number and/or combination of cache levels (L1C, L2C, LLC, etc.).

The translation lookaside buffer (TLB) circuitry 140 includes any number and/or combination of electrical components, semiconductor devices, and/or logic elements capable of storing information and/or data that logically associates each of a plurality of recently and/or frequently used virtual memory addresses with a respective physical memory address. In embodiments, the TLB circuitry 140 may be disposed at least partially within the processing unit 102. The cache circuitry 130 may provide all or a portion of the TLB circuitry 140. In embodiments, the TLB circuitry 140 stores all or a portion of the information and/or data that logically associates each of a plurality of virtual memory addresses with a respective physical memory address as a data store, data table, or database.

The range register circuitry 150 includes any number and/or combination of electrical components, semiconductor devices, and/or logic elements capable of storing information and/or data identifying physical memory addresses containing privileged information and/or data and/or secret information and/or data. In embodiments, the range register circuitry 150 may be implemented as one or more model-specific registers (MSRs) associated with the kernel and/or each instantiation of an application on the system 100. In embodiments, the one or more MSRs may be accessed at the kernel or supervisory level. The systems and methods described herein beneficially and advantageously use the range register circuitry 150 to detect when a lookup miss in the TLB circuitry 140 is associated with a physical memory address containing either a privileged object associated with the kernel (i.e., kernel physical memory addresses 182$_1$-182$_n$) or a secret object associated with a user application (i.e., first application physical memory addresses 184A$_1$-184A$_n$ or second application physical memory addresses 184B$_1$-184B$_n$).

The PMC circuitry 160 includes any number and/or combination of electrical components, semiconductor devices, and/or logic elements capable of detecting, counting, identifying, and/or receiving information indicative of a memory access request at a virtual memory address resulting in a TLB miss and which the range register circuitry 150 determines is directed to a physical memory address containing either a privileged object associated with the kernel (i.e., kernel physical memory addresses 182$_1$-182$_n$) or a secret object associated with a user application (i.e., first application physical memory addresses 184A$_1$-184A$_n$ or second application physical memory addresses 184B$_1$-184B$_n$). In embodiments, upon detecting a TLB miss associated with either a privileged object associated with the kernel (i.e., kernel physical memory addresses 182$_1$-182$_n$) or a secret object associated with a user application (i.e., first application physical memory addresses 184A$_1$-184A$_n$ or second application physical memory addresses 184B$_1$-

184B$_n$), the PMC circuitry 160 may cause a performance monitoring interrupt (PMI) to notify the operating system of the attempt to access privileged or secret information.

The storage device 104 may include any number and/or combination of currently available and/or future developed systems and/or devices capable of persistently storing or otherwise retaining information, data, and/or instructions 162, such as an operating system instruction set, kernel address space layout (KASLR) randomization instructions 106 and side channel attack detection instructions 108. The storage device 104 may include one or more fixed storage devices and/or one or more removable storage devices.

The KASLR instructions 106 include one or more instruction sets that cause the system to randomly allocate kernel address space during the startup, restart, or boot of the system 100. The side-channel attack detection instructions 108 include one or more instruction sets that cause the processor circuitry to:

detect a miss in the TLB circuitry on a virtual memory address lookup operation;

cause the range register circuitry 160 to determine whether the physical memory address associated with the virtual memory address lookup operation is within a physical address range containing a privileged object or a secret object;

responsive to a determination that a TLB miss has occurred and the physical memory address associated with the TLB lookup operation contains a privileged object or a secret object, cause the PMC circuitry to generate a performance monitoring interrupt; and cause a storage of information and/or data associated with the instruction causing the virtual address lookup operation.

Figure 2:
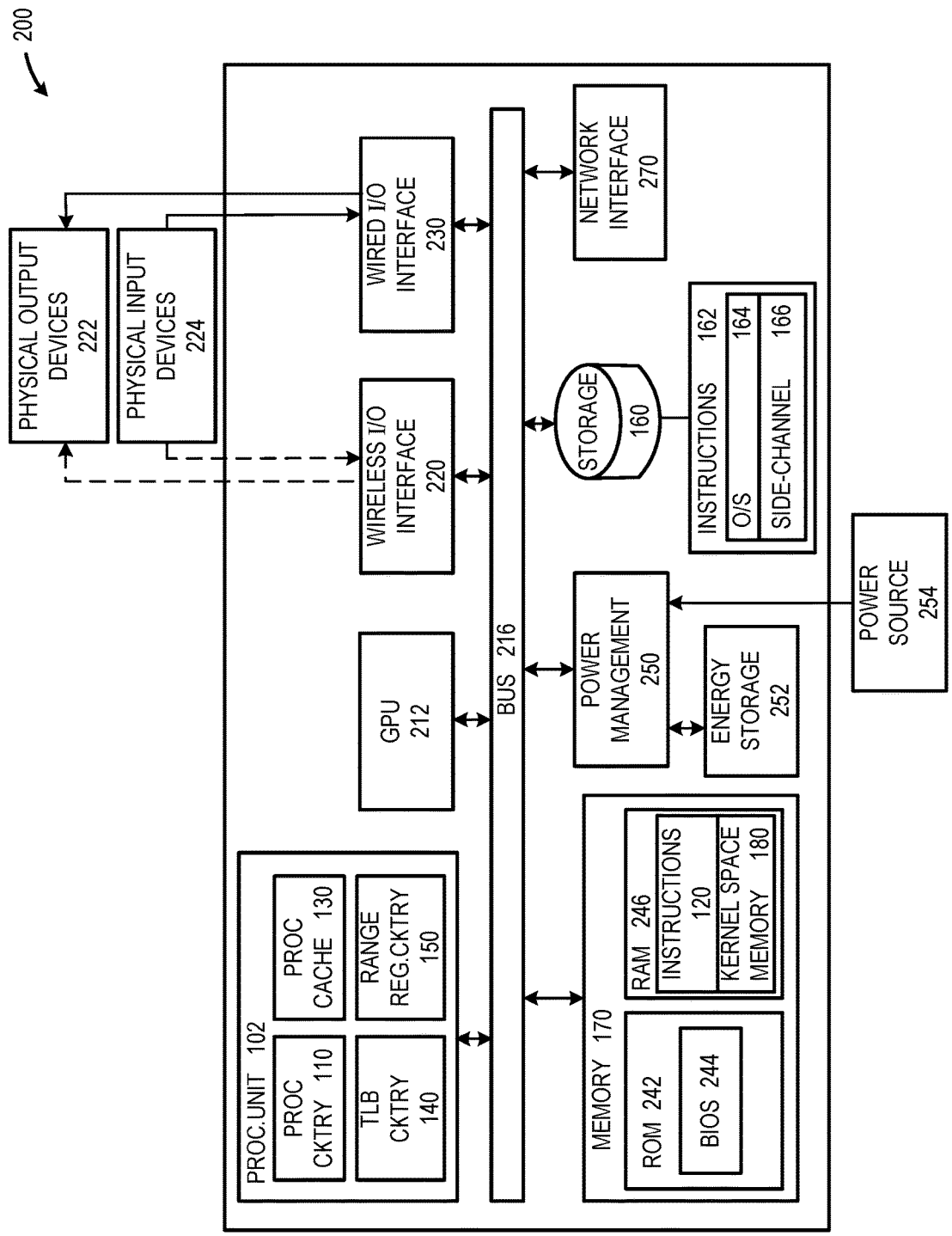
FIG. 2 is a schematic diagram of an illustrative electronic, processor-based, device that includes a processing unit, such as a central processing unit (CPU), system-on-chip (SoC), or multi-chip module (MCM), having processor circuitry which implements KASLR during a startup, restart, or boot operation and which causes the processor circuitry to perform one or more side channel attack detection operations, in accordance with at least one embodiment described herein.

FIG. 2 is a schematic diagram of an illustrative electronic, processor-based, device 200 that includes a processing unit 102, such as a central processing unit (CPU), system-on-chip (SoC), or multi-chip module (MCM), having processor circuitry 110 which implements KASLR during a startup, restart, or boot operation and which causes the processor circuitry to perform one or more side channel attack detection operations, in accordance with at least one embodiment described herein. The processor-based device 200 may additionally include one or more of the following: a graphical processing unit 212, a wireless input/output (I/O) interface 220, a wired I/O interface 230, system memory 170, power management circuitry 250, a non-transitory storage device 104, and a network interface 270. The following discussion provides a brief, general description of the components forming the illustrative processor-based device 200. Example, non-limiting processor-based devices 200 may include, but are not limited to: smartphones, wearable computers, portable computing devices, handheld computing devices, desktop computing devices, blade server devices, workstations, and similar.

In some embodiments, the processor-based device 200 includes graphics processor circuitry 212 capable of executing machine-readable instruction sets and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 110 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 200 includes a bus or similar communications link 216 that communicably couples and facilitates the exchange of information and/or data between various system components including the processor circuitry 110, the graphics processor circuitry 212, one or more wireless I/O interfaces 220, one or more wired I/O interfaces 230, the system memory 170, one or more storage devices 104, and/or one or more network interfaces 270. The processor-based device 200 may be referred to in the singular herein, but this is not intended to limit the embodiments to a single processor-based device 200, since in certain embodiments, there may be more than one processor-based device 200 that incorporates, includes, or contains any number of communicably coupled, collocated, or remote networked circuits or devices.

The processor circuitry 110 may include any number, type, or combination of currently available or future developed devices capable of executing machine-readable instruction sets. The processor circuitry 110 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 2 are of conventional design. Consequently, such blocks need not be described in further detail herein, as they will be understood by those skilled in the relevant art. The bus 216 that interconnects at least some of the components of the processor-based device 200 may employ any currently available or future developed serial or parallel bus structures or architectures.

The system memory 170 may include read-only memory ("ROM") 242 and random access memory ("RAM") 246. A portion of the ROM 242 may be used to store or otherwise retain a basic input/output system ("BIOS") 244. The BIOS 244 provides basic functionality to the processor-based device 200, for example by causing the processor circuitry 110 to load and/or execute one or more machine-readable instruction sets, such as the operating system instructions, the KASLR instructions 106, and/or the side-channel attack detection instructions 108. In embodiments, at least some of the one or more machine-readable instruction sets cause at least a portion of the processor circuitry 120 to provide, create, produce, transition, and/or function as a dedicated, specific, and particular machine, for example a word processing machine, a digital image acquisition machine, a media playing machine, a gaming system, a communications device, a smartphone, or similar. In embodiments, the RAM 246 may include all or a portion of the kernel physical memory 180 and/or the application physical memory 190.

The processor-based device 200 may include at least one wireless input/output (I/O) interface 220. The at least one wireless I/O interface 220 may be communicably coupled to one or more physical output devices 222 (tactile devices, video displays, audio output devices, hardcopy output devices, etc.). The at least one wireless I/O interface 220 may communicably couple to one or more physical input devices 224 (pointing devices, touchscreens, keyboards, tactile devices, etc.). The at least one wireless I/O interface 220 may include any currently available or future developed wireless I/O interface. Example wireless I/O interfaces include, but are not limited to: BLUETOOTH®, near field communication (NFC), and similar.

The processor-based device 200 may include one or more wired input/output (I/O) interfaces 230. The at least one wired I/O interface 230 may be communicably coupled to one or more physical output devices 222 (tactile devices, video displays, audio output devices, hardcopy output devices, etc.). The at least one wired I/O interface 230 may be communicably coupled to one or more physical input devices 224 (pointing devices, touchscreens, keyboards, tactile devices, etc.). The wired I/O interface 230 may include any currently available or future developed I/O interface. Example wired I/O interfaces include but are not limited to: universal serial bus (USB), IEEE 1394 ("Fire-Wire"), and similar.

The processor-based device 200 may include one or more communicably coupled, non-transitory, data storage devices 104. The data storage devices 104 may include one or more hard disk drives (HDDs) and/or one or more solid-state storage devices (SSDs). The one or more data storage devices 104 may include any current or future developed storage appliances, network storage devices, and/or systems. Non-limiting examples of such data storage devices 104 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 104 may include one or more removable storage devices, such as one or more flash drives, flash memories, flash storage units, or similar appliances or devices capable of communicable coupling to and decoupling from the processor-based device 200.

The one or more data storage devices 104 may include interfaces or controllers (not shown) communicatively coupling the respective storage device or system to the bus 216. The one or more data storage devices 104 may store, retain, or otherwise contain machine-readable instruction sets, data structures, program modules, data stores, databases, logical structures, and/or other data useful to the processor circuitry 110 and/or graphics processor circuitry 212 and/or one or more applications executed on or by the processor circuitry 110 and/or graphics processor circuitry 212. In some instances, one or more data storage devices 104 may be communicably coupled to the processor circuitry 110, for example via the bus 216 or via one or more wired communications interfaces 230 (e.g., Universal Serial Bus or USB); one or more wireless communications interfaces 220 (e.g., Bluetooth®, Near Field Communication or NFC); and/or one or more network interfaces 270 (IEEE 802.3 or Ethernet, IEEE 802.11, or WiFi®, etc.).

The one or more data storage devices 104 stores all or a portion of the instructions executed, at least in part, by the processor circuitry 110. The one or more data storage devices 104 may store, include, or otherwise retain operating system instructions. The operating system instructions may include but are not limited to any version up to the latest release of: Windows®; OSx®; iOS®; Android Linux®; and similar. The one or more storage devices 104 may store, include, or otherwise retain application instructions executed by the processor circuitry 110. Such applications may include but are not limited to: productivity software; communications software; entertainment software; audio and/or video playback software; or similar. The one or more storage devices 104 may store, include, or otherwise retain the side-channel attack detection instructions 108 executed by the processor circuitry 110.

The processor-based device 200 may include power management circuitry 250 that controls one or more operational aspects of the energy storage device 252. In embodiments, the energy storage device 252 may include one or more primary (i.e., non-rechargeable) or secondary (i.e., rechargeable) batteries or similar energy storage devices. In embodiments, the energy storage device 252 may include one or more supercapacitors or ultracapacitors. In embodiments, the power management circuitry 250 may alter, adjust, or control the flow of energy from an external power source 254 to the energy storage device 252 and/or to the processor-based device 200. The power source 254 may include, but is not limited to, a solar power system, a commercial electric grid, a portable generator, an external energy storage device, or any combination thereof.

For convenience, the processor circuitry 110, the storage device 104, the system memory 170 (including kernel physical memory 180 and the application physical memory 190), the graphics processor circuitry 212, the wireless I/O interface 220, the wired I/O interface 230, the power management circuitry 250, and the network interface 270 are illustrated as communicatively coupled to each other via the bus 216, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via one or more intermediary components (not shown). In another example, one or more of the above-described components may be integrated into the processing unit 102 and/or the graphics processor circuitry 212. In some embodiments, all or a portion of the bus 216 may be omitted and the components are coupled directly to each other using suitable wired or wireless connections.

Figure 3:
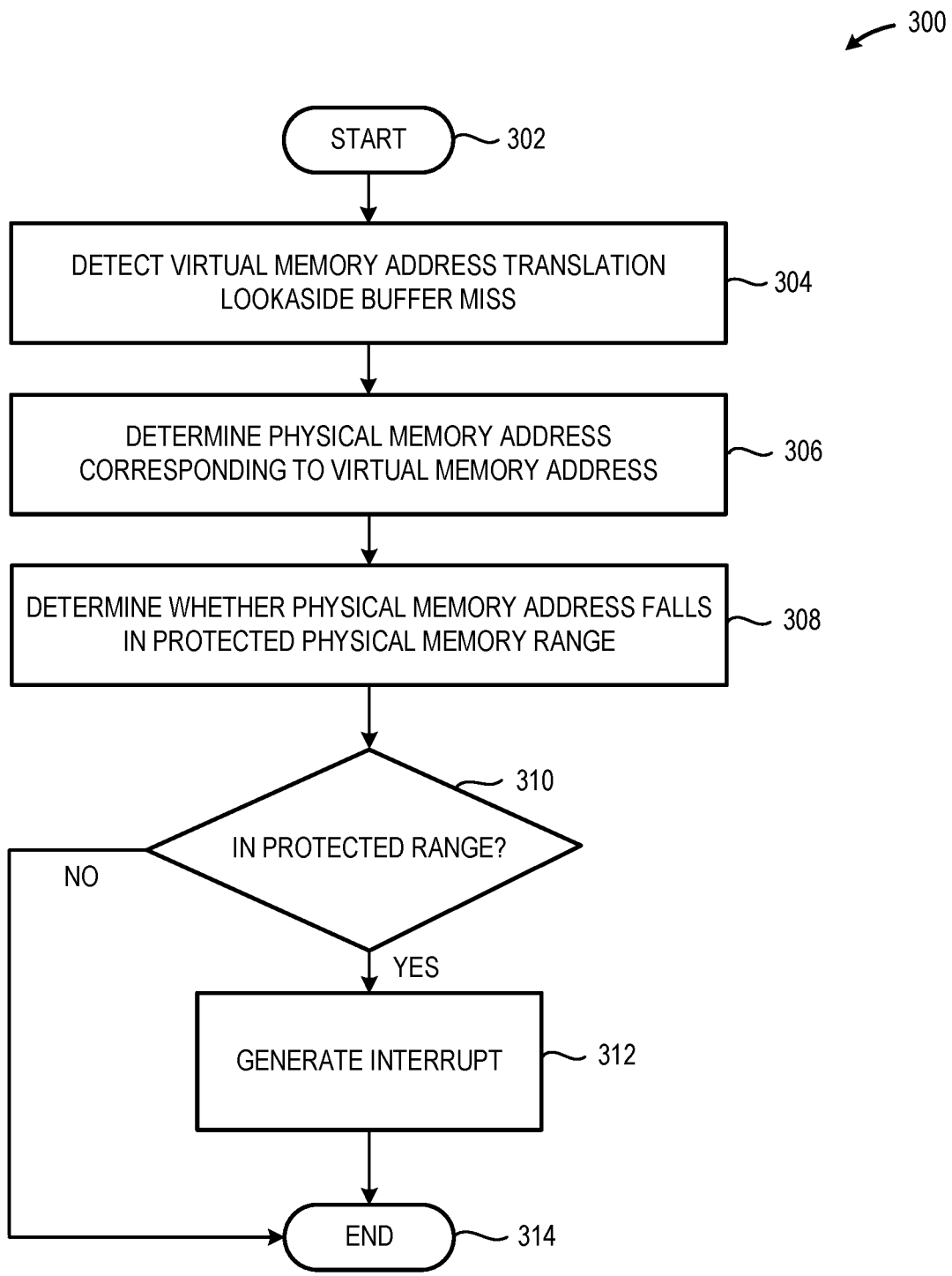
FIG. 3 is a high-level flow diagram of an illustrative method of a detecting a side-channel attack by causing the performance monitoring counter circuitry to detect a TLB miss caused by a virtual memory address and determine whether the physical memory address corresponding to the virtual memory address contains a privileged object or a secret object, in accordance with at least one embodiment described herein.

FIG. 3 is a high-level flow diagram of an illustrative method 300 of a detecting a side-channel attack by causing the performance monitoring counter circuitry 160 to detect a TLB miss caused by a virtual memory address and determine whether the physical memory address corresponding to the virtual memory address contains a privileged object or a secret object, in accordance with at least one embodiment described herein. A kernel virtual address space $122_1$-$122_n$ is mapped to a physical memory address range $182_1$-$182_n$, each of which contains or otherwise retains a privileged object. Similarly a respective virtual address range $124_1$-$124_n$ associated with each of a plurality of users are mapped to a respective physical memory range $194_1$-$194_n$, each of which contains or otherwise retains a secret object. The method 300 commences at 302. Instructions executed by the processor circuitry 110 cause memory access operations at one or more virtual memory addresses. The processor circuitry (e.g., via memory management circuitry) looks up the virtual memory address in one or more data structures disposed or otherwise retained in the TLB circuitry 140. If the virtual memory address is not included in the TLB circuitry 140, the processor circuitry 110 causes a lookup of the physical memory address associated with the virtual memory address (e.g., using one or more page tables or similar data structures). The range register circuitry 150 and the PMC circuitry 160 determine whether the physical memory address is used to store or otherwise retain a privileged object or a secret object. The method 300 commences at 302.

At 304, the PMC circuitry 160 receives an input indicative of a virtual memory address translation lookaside buffer miss. In embodiments, one or more instructions executed by the processor circuitry 110 causes a memory access operation on a virtual memory address. In embodiments, the one or more instructions may perform an operation on a virtual memory location associated with the kernel physical memory space 180. In other embodiments, the one or more instructions may perform an operation on a virtual memory location associated with a user-level application physical memory space 190.

At 306, the physical memory address corresponding to the virtual memory address operation from 304 is determined. In embodiments, the physical memory address corresponding to the virtual memory address is obtained using one or more data stores, data structures, data tables, or databases stored or otherwise retained in the TLB circuitry 140 (i.e., a TLB "hit"). In embodiments, the physical memory address corresponding to the virtual memory address is obtained using one or more data stores, data structures, data tables, or databases stored or otherwise retained in a page table or similar structure (i.e., a TLB "miss").

At 308, the range register circuitry 150 determines whether the physical memory address corresponding to the virtual memory address operation from 304 is a physical memory address associated with either a privileged object or a secret object. In embodiments, the range register circuitry 150 performs a lookup operation or similar using one or more data stores, data structures, data tables, or databases that include physical memory addresses associated with privileged objects and/or secret objects.

At 310, the PMC circuitry 160 determines whether physical memory address corresponding to the virtual memory address operation at 304 includes a physical memory address that stores or otherwise retains a privileged object or a secret object. If the physical memory address corresponding to the virtual memory address operation at 304 does not store or otherwise retain a privileged object or a secret object, the method 300 concludes at 314. If the physical memory address corresponding to the virtual memory address operation at 304 stores or otherwise retains a privileged object or a secret object, the method 300 continues at 312.

At 312, responsive to a determination by the range register circuitry 150 that the virtual memory operation at 304 caused a TLB miss and the physical memory address corresponding to the virtual memory address operation at 304 contains, stores, or otherwise retains a privileged object (e.g., an object in kernel memory 180) or a secret object (e.g., an object in another user's application memory 190), the PMC circuitry 160 generates a performance monitor interrupt (PMI) output. In embodiments, the PMI output may be communicated to the operating system executed by the processor circuitry 110. The method 300 concludes at 314.

Figure 4:
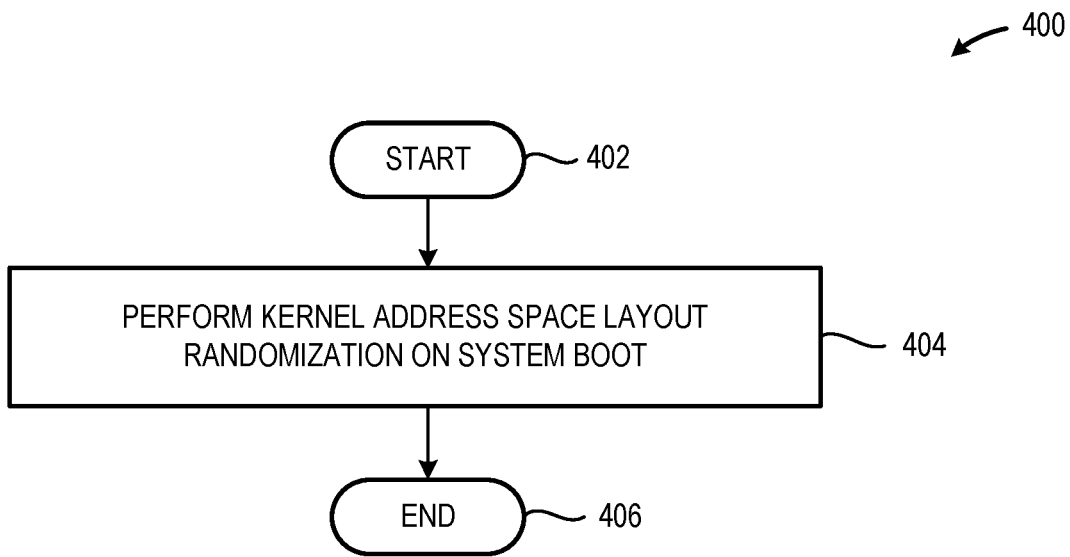
FIG. 4 is a high-level flow diagram of an illustrative method of performing kernel address space layout randomization (KASLR) on system bot, re-boot, or startup, in accordance with at least one embodiment described herein.

FIG. 4 is a high-level flow diagram of an illustrative method 400 of detecting a side-channel attack by causing the PMC circuitry 160 to detect an occurrence of a TLB miss caused by a processor executed instruction causing a memory access at a virtual memory address and to determine whether the virtual memory address corresponds to a physical memory address within a range of physical memory addresses containing either a privileged object, such as an object in kernel memory 180, or a secret object, such as an object in another user's application memory 190, in accordance with at least one embodiment described herein. In embodiments, the system 100 may employ KASLR upon system start-up or reboot to randomize the location of kernel objects within the kernel memory 180. The method 400 may be used in conjunction with the method 300 described above in detail with regard to FIG. 3. The method 400 commences at 402.

At 404, the processor circuitry 110 randomizes the placement of kernel objects (e.g., privileged objects such as code and/or data) within the system physical memory 170 to increase the difficulty for an attacker to determine the location of the kernel objects. The kernel objects occupy only a small portion of the kernel memory space. Using KASLR, the processor circuitry 110 generates one or more page tables that includes information and/or data mapping each kernel virtual memory address $122_1$-$122_n$ to a respective physical memory address $182_1$-$182_n$ in the kernel memory space 180. The method 400 concludes at 406.

Figure 5:
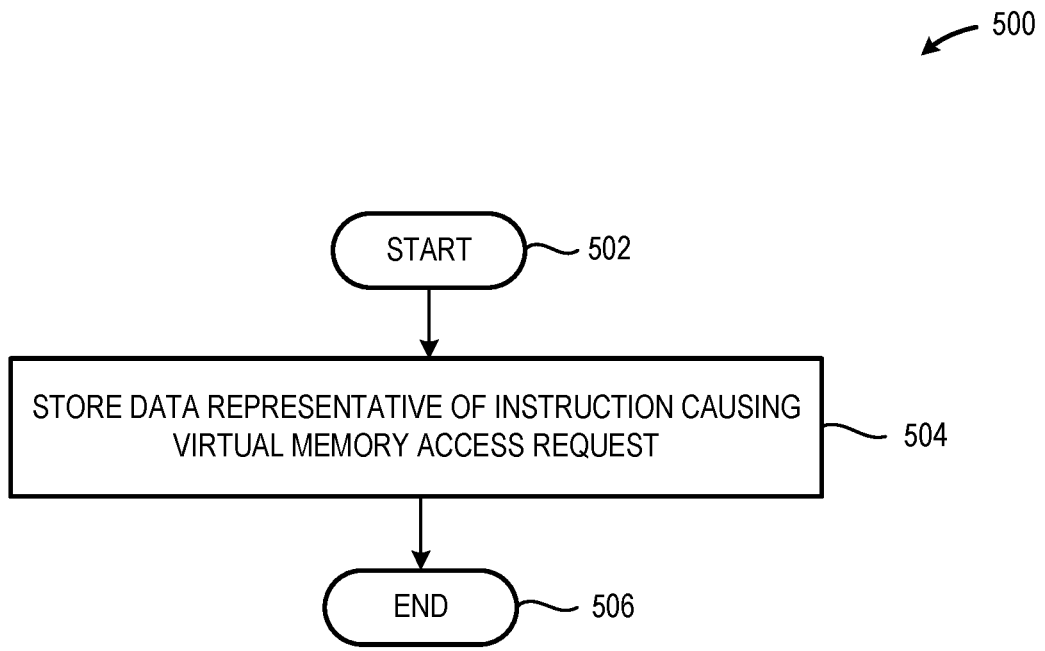
FIG. 5 is a high-level flow diagram of storing information and/or data associated with one or more instructions responsible for causing a virtual memory access operation in accordance with at least one embodiment described herein.

FIG. 5 is a high-level flow diagram of an illustrative method 500 alerting an operating system executed by processor circuitry of a side-channel attack by causing PMC circuitry 160 to generate a performance monitoring interrupt in response to detection of an occurrence of a TLB miss caused by a processor executed instruction causing a memory access at a virtual memory address and a determination that the virtual memory address corresponds to a physical memory address within a range of physical memory addresses containing either a privileged object, such as an object in kernel memory 180, or a secret object, such as an object in another user's application memory 190 in accordance with at least one embodiment described herein. The method 500 may be used in conjunction with the method 300 described above in detail with regard to FIG. 3 and/or the method 400 described above in detail with regard to FIG. 4. Responsive to a determination by the PMC circuitry 160 that a side-channel attack may be occurring, the PMC circuitry 160 generates an interrupt that is communicated to the operating system and may cause a collection of information associated with the source of the instruction causing the memory access to an physical memory address containing a privileged object or a secret object. The method 500 commences at 502.

At 504, the PMC circuitry 160 causes a storage of information and/or data associated with the instruction causing the TLB miss and the memory access at the virtual memory address corresponding to a physical memory address within a range of physical memory addresses containing either a privileged object, such as an object in kernel memory 180, or a secret object, such as an object in another user's application memory 190. The method 500 concludes at 506.

While FIGS. 3, 4, and 5 illustrate various operations according to one or more embodiments, it is to be understood that not all of the operations depicted in FIGS. 3, 4, and 5 are necessary for other embodiments. Indeed, it is fully contemplated herein that in other embodiments of the present disclosure, the operations depicted in FIGS. 3, 4, and 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C.

As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods of detecting a side-channel attack detecting a translation lookaside buffer (TLB) miss on a virtual address lookup caused by the speculative execution of an instruction and determining that the physical memory address associated with the virtual address lookup contains a privileged object or a secret object. Range register circuitry determines whether the physical memory address is located in an address range containing privileged objects or secret objects. Performance monitoring counter circuitry receives information indicative of the TLB miss and information indicative that the physical memory address contains a privileged object or a secret object. The PMC circuitry generates an interrupt in response to receipt of information indicative of the TLB miss and information indicative that the physical memory address contains a privileged object or a secret object. The PMC circuitry causes the storage of information associated with the speculatively executed instruction causing the virtual address lookup.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for detecting side-channel attacks on a system using KASLR by detecting TLB misses and determining whether a physical memory address corresponding to the virtual memory address causing the TLB miss contains a privileged object or a secret object.

According to example 1, there is provided a side-channel attack detection system. The system may include: processor circuitry to execute an instruction; physical memory circuitry coupled to the processor circuitry; translation lookaside buffer (TLB) circuitry to determine a physical memory address corresponding to a virtual memory address responsive to the execution of the instruction by the processor circuitry; range register circuitry to determine whether the physical memory address falls within a defined range of physical memory addresses; and performance monitoring counter (PMC) circuitry to generate a performance monitoring interrupt responsive to receipt of information indicative of: a miss in the TLB circuitry of the virtual memory address; and the physical memory address falling within the defined range of physical memory addresses.

Example 2 may include elements of example 1 where the PMC circuitry may further cause a storage of information associated with the speculatively executed instruction responsive to generation of the performance monitoring interrupt.

Example 3 may include elements of any of examples 1 or 2, the range register circuitry to determine whether the physical memory address falls within a defined range of physical memory addresses that includes at least one of: a privileged object or a secret object.

Example 4 may include elements of any of examples 1 through 3, the processor circuitry to further: perform a kernel address space layer randomization (KASLR) to randomly distribute kernel objects in the physical memory.

According to example 5, there is provided a non-transitory storage device. The non-transitory storage device may include instructions that, when executed, cause processor circuitry to: execute an instruction that causes a memory access at a virtual memory address; cause translation lookaside buffer (TLB) circuitry to determine a physical memory address corresponding to the virtual memory address responsive to execution of the instruction; cause range register circuitry to determine whether the physical memory address falls within a defined range of physical memory addresses; and cause performance monitoring counter (PMC) circuitry to generate a performance monitoring interrupt responsive to: a miss in the TLB circuitry of the virtual memory address; and the physical memory address falling within the defined range of physical memory addresses.

Example 6 may include elements of example 5, and the instructions when executed by the processor circuitry, further cause the processor circuitry to: cause the PMC circuitry to store of information associated with the speculatively executed instruction responsive to generation of the performance monitoring interrupt.

Example 7 may include elements of any of examples 5 or 6 where the instructions that cause the processor circuitry to determine whether the physical memory address falls within a defined range of physical memory addresses further cause the processor circuitry to: cause the range register circuitry to determine whether the physical memory address falls within a defined range of physical memory addresses that includes at least one of: a privileged object or a secret object.

Example 8 may include elements of any of examples 5 through 7 where the instructions further cause the processor circuitry to: perform a kernel address space layer randomization (KASLR) to randomly distribute kernel objects in the physical memory.

According to example 9, there is provided a side-channel detection system. The system may include: means for speculatively executing an instruction that causes a memory access at a virtual memory address; means for determining a physical memory address corresponding to the virtual memory address; means for determining whether the physical memory address falls within a defined range of physical memory addresses; and means for generating a performance monitoring interrupt responsive to: a miss in the TLB circuitry of the virtual memory address; and the physical memory address falling within the defined range of physical memory addresses.

Example 10 may include elements of example 9 and the system may further include: means for causing a storage of information associated with the speculatively executed instruction responsive to generation of the performance monitoring interrupt.

Example 11 may include elements of any examples 9 or 10 where the means for determining whether the physical memory address falls within a defined range of physical memory addresses further comprises: means for determining whether the physical memory address falls within a defined range of physical memory addresses that includes at least one of: a privileged object or a secret object.

Example 12 may include elements of examples 9 through 11, and the system may further include: means for performing a kernel address space layer randomization (KASLR) to randomly distribute kernel objects in the physical memory.

According to example 13, there is provided a side-channel detection method. The method may include: speculatively executing, by processor circuitry, an instruction that causes a memory access at a virtual memory address; determining, by translation lookaside buffer (TLB) circuitry, a physical memory address corresponding to the virtual memory address; determining, by range register circuitry, whether the physical memory address falls within a defined range of physical memory addresses; and generating, by performance monitoring counter (PMC) circuitry, a performance monitoring interrupt responsive to: a miss in the TLB circuitry of the virtual memory address; and the physical memory address falling within the defined range of physical memory addresses.

Example 14 may include elements of example 13 and the method may further include: causing, by the PMC circuitry, a storage of information associated with the speculatively executed instruction responsive to generation of the performance monitoring interrupt.

Example 15 may include elements of any of examples 13 or 14 where determining whether the physical memory address falls within a defined range of physical memory addresses further comprises: determining, by the range register circuitry, whether the physical memory address falls within a defined range of physical memory addresses that includes at least one of: a privileged object or a secret object.

Example 16 may include elements of any of examples 13 through 15, and the method may further include: performing, by the processor circuitry, a kernel address space layer randomization (KASLR) to randomly distribute kernel objects in the physical memory.

According to example 17, there is provided an electronic device. The electronic device may include: a printed circuit board; network interface circuitry; and a side-channel attack detection system comprising: processor circuitry coupled to the printed circuit board, the processor circuitry to: execute an operating system; speculatively execute an instruction; physical memory circuitry coupled to the processor circuitry; translation lookaside buffer (TLB) circuitry to determine a physical memory address corresponding to a virtual memory address responsive to the speculative execution of the instruction by the processor circuitry; range register circuitry to determine whether the physical memory address falls within a defined range of physical memory addresses; performance monitoring counter (PMC) circuitry to generate a performance monitoring interrupt responsive to receipt of information indicative of: a miss in the TLB circuitry of the virtual memory address; and the physical memory address falling within the defined range of physical memory addresses.

Example 18 may include elements of example 17, the PMC circuitry to further: cause a storage of information associated with the speculatively executed instruction responsive to generation of the performance monitoring interrupt.

Example 19 may include elements of any of examples 17 or 18, the range register circuitry to determine whether the physical memory address falls within a defined range of physical memory addresses that includes at least one of: a privileged object or a secret object.

Example 20 may include elements of any of examples 17 through 19, the processor circuitry to further: perform a kernel address space layer randomization (KASLR) to randomly distribute kernel objects in the physical memory.

According to example 21, there is provided a system for detecting a side-channel attack using range register circuitry and performance management counter circuitry, the system being arranged to perform the method of any of claims 13 through 16.

According to example 22, there is provided a chipset arranged to perform the method of any of claims 13 through 16.

According to example 23, there is provided at least one machine readable medium comprising a plurality of instructions that, in response to be being executed on a computing device, cause the computing device to carry out the method according to any of claims 13 through 16.

According to example 24, there is provided a device configured for detecting a side-channel attack using range register circuitry and performance management counter circuitry, the device being arranged to perform the method of any of claims 13 through 16.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A side-channel attack detection system comprising:
   processor circuitry to speculatively execute an instruction;
   physical memory circuitry coupled to the processor circuitry;
   translation lookaside buffer (TLB) circuitry to determine a physical memory address corresponding to a virtual memory address responsive to speculative execution of the instruction by the processor circuitry;
   range register circuitry to determine whether the physical memory address falls within a defined range of physical memory addresses;
   performance monitoring counter (PMC) circuitry to generate a performance monitoring interrupt responsive to receipt of information indicative of:
     a miss in the TLB circuitry of the virtual memory address in response to the speculative execution of the instruction; and
     the physical memory address falling within the defined range of physical memory addresses.

2. The system of claim 1, wherein the PMC circuitry to further:
   cause a storage of second information associated with the speculative execution of the instruction responsive to generation of the performance monitoring interrupt.

3. The system of claim 1, the range register circuitry to determine whether the physical memory address falls within the defined range of physical memory addresses that includes at least one of: a privileged object or a secret object.

4. The system of claim 1, the processor circuitry to further:
   perform a kernel address space layer randomization (KASLR) to randomly distribute kernel objects in the physical memory circuitry.

5. A non-transitory storage device that includes instructions that, when executed, cause processor circuitry to:
   speculatively execute an instruction that causes a memory access at a virtual memory address;
   cause translation lookaside buffer (TLB) circuitry to determine a physical memory address corresponding to the virtual memory address responsive to speculative execution of the instruction;
   cause range register circuitry to determine whether the physical memory address falls within a defined range of physical memory addresses; and
   cause performance monitoring counter (PMC) circuitry to generate a performance monitoring interrupt responsive to:
     a miss in the TLB circuitry of the virtual memory address in response to the speculative execution of the instruction; and
     the physical memory address falling within the defined range of physical memory addresses.

6. The non-transitory storage device of claim 5, wherein the instructions, when executed by the processor circuitry, further cause the processor circuitry to:
   cause the PMC circuitry to store information associated with the speculative execution of the instruction responsive to generation of the performance monitoring interrupt.

7. The non-transitory storage device of claim 5, wherein the instructions that cause the processor circuitry to determine whether the physical memory address falls within the defined range of physical memory addresses, when executed by the processor circuitry, further cause the processor circuitry to:
   cause the range register circuitry to determine whether the physical memory address falls within the defined range of physical memory addresses that includes at least one of: a privileged object or a secret object.

8. The non-transitory storage device of claim 5, wherein the instructions, when executed by the processor circuitry, further cause the processor circuitry to:
   perform a kernel address space layer randomization (KASLR) to randomly distribute kernel objects in physical memory.

9. A side-channel detection system, comprising:
   means for speculatively executing an instruction that causes a memory access at a virtual memory address;
   means for determining a physical memory address corresponding to the virtual memory address responsive to speculative execution of the instruction;
   means for determining whether the physical memory address falls within a defined range of physical memory addresses; and
   means for generating a performance monitoring interrupt responsive to:
     a miss in translation lookaside buffer (TLB) circuitry of the virtual memory address in response to the speculative execution of the instruction; and
     the physical memory address falling within the defined range of physical memory addresses.

10. The system of claim 9, further comprising:
    means for causing a storage of information associated with the speculative execution of the instruction responsive to generation of the performance monitoring interrupt.

11. The system of claim 9, wherein the defined range of physical memory addresses includes at least one of: a privileged object or a secret object.

12. The system of claim 9, further comprising:
    means for performing a kernel address space layer randomization (KASLR) to randomly distribute kernel objects in physical memory.

13. A side-channel detection method, comprising:
    speculatively executing, by processor circuitry, an instruction that causes a memory access at a virtual memory address;

determining, by translation lookaside buffer (TLB) circuitry, a physical memory address corresponding to the virtual memory address responsive to speculative execution of the instruction by the processor circuitry;

determining, by range register circuitry, whether the physical memory address falls within a defined range of physical memory addresses; and generating, by performance monitoring counter (PMC) circuitry, a performance monitoring interrupt responsive to:
- a miss in the TLB circuitry of the virtual memory address in response to the speculative execution of the instruction; and
- the physical memory address falling within the defined range of physical memory addresses.

14. The method of claim 13, further comprising:
causing, by the PMC circuitry, a storage of information associated with the speculative execution of the instruction responsive to generation of the performance monitoring interrupt.

15. The method of claim 13, wherein determining whether the physical memory address falls within the defined range of physical memory addresses further comprises:
determining, by the range register circuitry, whether the physical memory address falls within the defined range of physical memory addresses that includes at least one of: a privileged object or a secret object.

16. The method of claim 13, further comprising:
performing, by the processor circuitry, a kernel address space layer randomization (KASLR) to randomly distribute kernel objects in physical memory.

17. An electronic device, comprising:
a printed circuit board;
network interface circuitry; and
a side-channel attack detection system comprising:
   processor circuitry to speculatively execute an instruction;
   physical memory circuitry coupled to the processor circuitry;
   translation lookaside buffer (TLB) circuitry to determine a physical memory address corresponding to a virtual memory address responsive to speculative execution of the instruction by the processor circuitry;
   range register circuitry to determine whether the physical memory address falls within a defined range of physical memory addresses;
   performance monitoring counter (PMC) circuitry to generate a performance monitoring interrupt responsive to receipt of information indicative of:
   - a miss in the TLB circuitry of the virtual memory address in response to the speculative execution of the instruction; and
   - the physical memory address falling within the defined range of physical memory addresses.

18. The electronic device of claim 17, the processor circuitry further to:
perform a kernel address space layer randomization (KASLR) to randomly distribute kernel objects in the physical memory circuitry.

* * * * *